United States Patent

Braunberger

[11] 3,715,845
[45] Feb. 13, 1973

[54] MOWER SICKLE HOLD-DOWN MEANS
[75] Inventor: Benjamin A. Braunberger, West Bend, Wis.
[73] Assignee: Gehl Company, West Bend, Wis.
[22] Filed: May 12, 1972
[21] Appl. No.: 252,865

[52] U.S. Cl..................................................56/305
[51] Int. Cl.............................................A01d 55/06
[58] Field of Search..............................56/296–313

[56] References Cited

UNITED STATES PATENTS

| | | | |
|---|---|---|---|
| 731,611 | 6/1903 | Pridmore | 56/305 |
| 1,158,501 | 11/1915 | Hopkins | 56/305 |
| 1,879,195 | 9/1932 | Gray | 56/298 |
| 2,500,104 | 3/1950 | Vutz | 56/305 |
| 3,151,434 | 10/1964 | Hamel | 56/296 |
| 3,314,222 | 4/1967 | Scarnato et al. | 56/305 |
| 3,553,948 | 1/1971 | White | 56/307 |

FOREIGN PATENTS OR APPLICATIONS

| 414,357 | 7/1946 | Italy | 56/305 |
|---|---|---|---|

*Primary Examiner*—Russell R. Kinsey
*Attorney*—James E. Nilles

[57] ABSTRACT

A hold-down clip is provided for a mower sickle for harvesting crops or the like in which reciprocating sickle sections cooperate with forged guards to provide a cutting action of the crop through which the mower moves. The clip extends over the rear portion only of the sickle sections and holds the sickle assembly down in position. The hold-down clip is out of the way and insures smooth flow of the crop over the sickle.

5 Claims, 4 Drawing Figures

PATENTED FEB 13 1973 3,715,845

MOWER SICKLE HOLD-DOWN MEANS

BACKGROUND OF THE INVENTION

The present invention pertains generally to mowing apparatus of the reciprocating sickle type and more particularly to means for maintaining the sickle assembly in proper cutting relationship to the sickle guards.

Conventional mowing apparatus sickle bars comprise a plurality of sickle sections riveted to an elongated bar and these sections have pairs of sharpened cutting edges converging forwardly of the bar. The sickle sections reciprocate through slots formed in associated guard members, and the sharpened edges cooperate with the longitudinal edges of the guard members to cut the standing crop as the mower advances through the field. The cutting action between the knife and the guard is of the shear type and consequently, proper operating relationship between the parts must be maintained.

Conventional prior art sickle mowers have utilized hold-down clips secured to the frame of the mower and which extend over the reciprocating sickle sections to hold them downwardly in proper relationship to the guard and to the wear plate. These hold-down clips offered impedance to the flow of the cut material over the sickle and frequently caused buildup of crop material and entanglement thereof. Furthermore, these conventional hold-down clips did not always provide the proper amount of clearance between the clip and the knife. Improper clearance between these elements resulted in a drag on the sickle bar and more rapid wear of the sickle sections and the clip.

It has also been proposed to use button-like hold-down clips over the rear portion only of the sickle, and in fore and aft alignment with the forwardly extending guards, so as not to impede rearward movement of the crop. This type has proved unsatisfactory in that the reciprocation of the sickle passing beneath the hold down buttons has tended to cause the buttons to rotate, thereby tending to loosen the bolt means by which they are held down.

SUMMARY OF THE INVENTION

The present invention provides a reciprocating sickle type mower having a sickle assembly for reciprocation in cutting cooperation with a plurality of sickle guards, a wear plate which maintains the sickle sections in proper fore and aft relationship and which absorb the rearward thrust of the sickle section, the rearward portion of the sickle sections extends rearward of the wear plate so as to be supported thereon, and a hold-down means is provided above the sickle assembly and which cooperates with the rear portion only of the sickle so as to hold and guide the sickle assembly on the wear plate in proper cutting position and without impeding flow of crop material thereover.

The improved hold-down means for the sickle mechanism provided by the present invention leaves the upper portion of the cutting mechanism relatively free and unencumbered and permits the cut crop to pass freely thereover. The improved hold-down means provided by the present invention also insures that the sickle section is held captive and guided even during the outermost limits of its travel so as to provide good guiding action for the entire length of the sickle assembly.

These and other objects and advantages of the present invention will appear hereinafter as this disclosure progresses, reference being had to the accompanying drawings.

DESCRIPTION OF A PREFERRED EMBODIMENT

Figure 2:
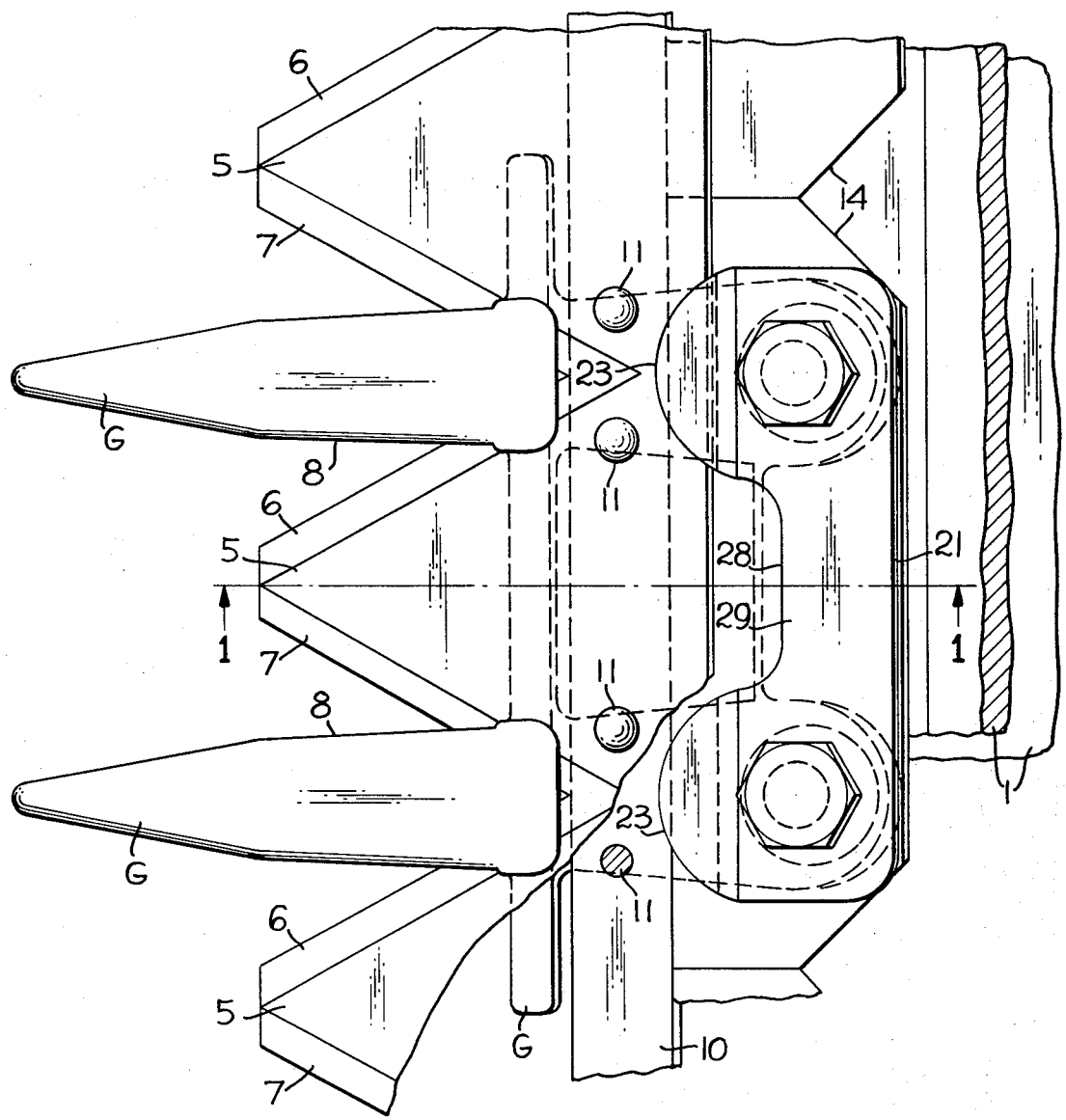
FIG. 2 is a plan view of the device shown in FIG. 1, certain parts being shown as broken away, in cross section, or removed for the sake of clarity in the drawings.

The mower assembly shown for the purpose of illustrating the invention is secured to a mower frame 1 of conventional character and which frame is located generally at the forward part of the crop cutting mechanism (not shown) with which it is used. A series of conventional forged sickle guards G are secured by bolt means 3 to the frame. These guards have slots 4 extending therethrough and through which the sickle sections 5 reciprocate. The sections themselves are conventional and have opposite, sharp cutting surfaces 6 and 7 which converge forwardly. These cutting edges cooperate with the edges 8 of the guards so as to cut the crop that is engaged therebetween.

The sickle sections 5 are secured to the transversely extending knife bar 10 by means of rivets 11.

A wear plate 14 is rigidly fastened to the frame 1 by the bolt means 3 which extends therethrough. The wear plate has a forwardly facing surface 15 against which the knife bar 10 slides during reciprocation of the sickle assembly. It will be noted in FIG. 1 that the sickle sections have a rearmost portion which extends over the forward edge of the wear plate and rests thereon. In other words, the wear plate defines the lowermost limit to which the rear portion of the sickle assembly can move.

Figure 1:
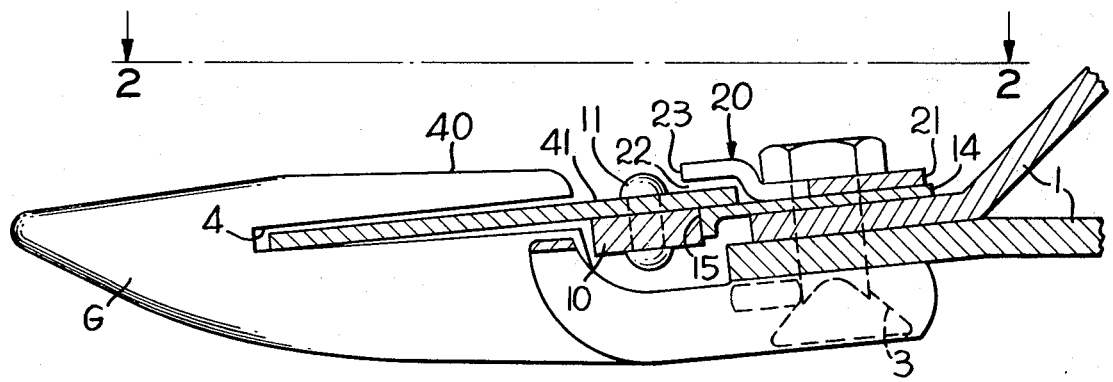
FIG. 1 is a vertical cross sectional view through a mower mechanism made in accordance with the present invention.
Figure 4:
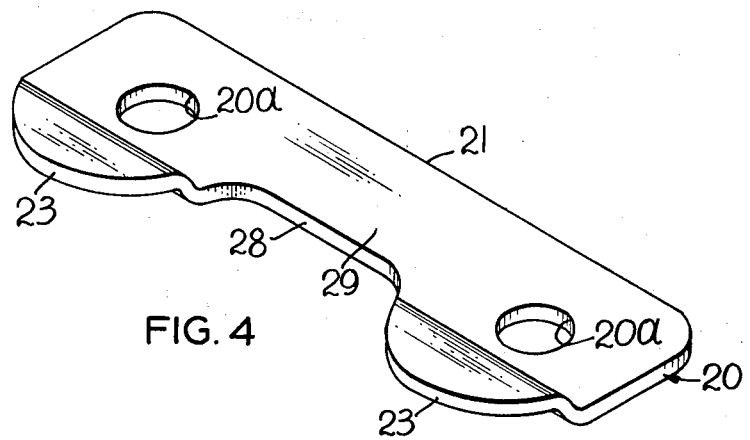
FIG. 4 is a perspective view of the means shown in FIG. 3.
Figure 3:
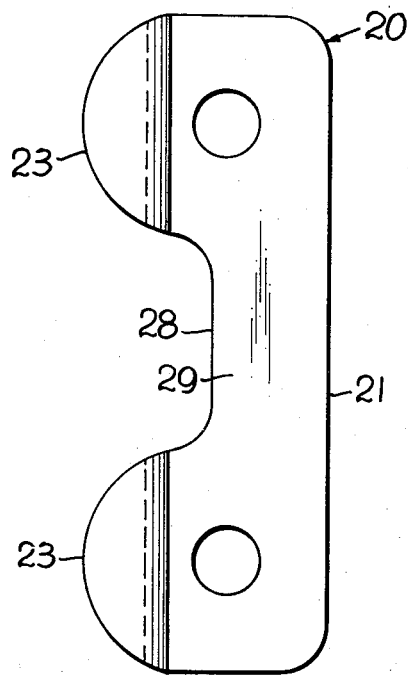
FIG. 3 is a plan view of the improved hold-down means.

To prevent the sickle assembly from raising out of the position shown in FIG. 1, and more specifically to insure that the sickle assembly maintains its proper cutting relationship with the guards G, a hold-down means in the form of a clip 20 is secured on top of the wear plate 14 by bolt means 3 which extend through holes 20a in the clip 20. One such hold-down means 20 may be provided for every other sickle section 5, but of course, other numbers of hold-down means may be used. In any event, one such hold-down means is provided at the extreme ends of the sickle assembly so as to control and guide even the outermost ends of the assembly.

The rearmost portion 21 of the hold-down means is a straight edge and generally lies along the rear edge of the wear plate 14. A small clearance 22 is provided between the sickle sections and the hold-down means so that the sickle assembly can slide freely in an accurately located vertical direction relative to the wear plate and the sickle guards. This distance 22 may be adjusted by bending the forward, rounded edge 23 either up or down, as desired, in respect to the rear edge of the sickle.

The two raised, forwardly extending, rounded edges 23 of each hold-down means are transversely spaced apart and are located directly behind the guards G and consequently permit unimpeded rearward flow of the cut crop material over the assembly. The central, intermediate edge 28 connected between the two edges 23, is located rearwardly of the raised, rounded portions and does not interfere with movement of the crop material.

It will be noticed, in referring to FIG. 2, that the connecting portion 29 that connects the rounded, raised edges 23, lies behind and generally at the same height as the sickle sections. The upper surface 40 of the guard is located above the upper surface 41 of the sickle sections which in turn are located above and upper surface of the wear plate 14. This presents a shingled relationship between the parts and one which permits the free and unrestricted flow of crop material over the mower mechanism.

With the improved hold-down means, the movement of the crop material is unimpeded and cannot loosen the hold-down means.

I claim:

1. Mowing apparatus of the reciprocating sickle type including a frame member, a series of transversely spaced sickle guards secured to said frame member and having slots therein, a sickle assembly adapted to reciprocate in said slots and including a knife bar and a series of sickle sections secured to the knife bar and on the upper surface thereof, a wear plate rigidly secured to said frame and having a forwardly extending portion, said sickle sections adapted to rest on said forwardly extending portion of said wear plate, said knife bar adapted to abut against the forward portion of said wear plate in thrust transmitting relationship therewith; and hold-down means secured to said frame member and having a pair of transversely spaced, rounded and raised forward edges, one directly behind adjacent guards, and an intermediate connecting portion integrally connecting said rounded forward edges together, said forward edges extending over the rear portions only of said sickle sections which rest on said wear plate, to thereby hold said sickle assembly captive on said forwardly extending portion of said wear plate.

2. The apparatus set forth in claim 1 further characterized in that said intermediate connecting portion is located rearwardly of said rounded forwardly edges and generally coextensive in height with said sickle sections.

3. A reciprocating sickle type crop cutter including a frame member, a series of transversely spaced sickle guards secured to said frame member and having transverse horizontal slots therein, a wear plate rigidly secured to said frame and having a forwardly extending portion, a sickle assembly including a knife bar and a series of sickle sections rigidly secured to the knife bar, said sections located on the upper surface of said bar and extending rearwardly therefrom, said sections abutting against the forwardly extending portion of said wear plate and in rearwardly overlapping relationship therewith, whereby said sickle sections rest on said forwardly extending portion of said wear plate, and hold-down means secured to said frame member and having a pair of transversely spaced, rounded and raised forward edges, one directly behind adjacent guards, and an intermediate connecting portion integrally connecting said rounded forward edges together, said forward edges extending over the rear portions only of said sickle sections which rest on said wear plate, whereby said sickle assembly is held captive in a vertical direction on said forwardly extending portion of said wear plate.

4. The apparatus set forth in claim 3 further characterized in that said intermediate connecting portion is located rearwardly of said rounded forwardly edges and generally coextensive in height with said sickle sections.

5. A hold-down clip fabricated from sheet steel and for a reciprocatable sickle of a mowing apparatus, said clip comprising a pair of spaced apart, forwardly extending portions having generally semi-circular forward edges, an intermediate portion integrally connected to and between said forwardly extending portions and having a front edge, said forwardly extending portions being raised above said intermediate portion, the front edge of said intermediate portion being located rearwardly of said raised forwardly extending portions, said clip adapted to be secured in position on said mower whereby said raised portions extend over said sickle.

* * * * *